(12) United States Patent
Yamada et al.

(10) Patent No.: US 8,564,801 B2
(45) Date of Patent: Oct. 22, 2013

(54) NETWORK SYSTEM, ELECTRONIC DEVICE, AND METHOD FOR CONTROLLING ELECTRONIC DEVICE IN NETWORK SYSTEM

(75) Inventors: Nobuyasu Yamada, Osaka (JP); Shuhji Fujii, Osaka (JP); Kouji Miyake, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 343 days.

(21) Appl. No.: 12/945,441

(22) Filed: Nov. 12, 2010

(65) Prior Publication Data

US 2011/0134474 A1    Jun. 9, 2011

(30) Foreign Application Priority Data

Dec. 8, 2009 (JP) ................................ 2009-278345

(51) Int. Cl.
*G06F 3/12* (2006.01)

(52) U.S. Cl.
USPC ......... 358/1.14; 358/1.15; 713/300; 713/375; 400/62; 710/64; 710/33; 710/19; 710/18; 710/15

(58) Field of Classification Search
USPC ............ 358/1.13, 1.15; 710/62, 110, 312, 33, 710/19, 18, 15; 709/326, 216, 223; 711/147; 713/300–375; 400/62
See application file for complete search history.

(56) References Cited

U.S. PATENT DOCUMENTS

| | | | |
|---|---|---|---|
| 5,784,581 A * | 7/1998 | Hannah | 710/110 |
| 6,944,689 B2 * | 9/2005 | Billington et al. | 710/62 |
| 7,359,074 B2 | 4/2008 | Ito | |
| 7,370,220 B1 * | 5/2008 | Nguyen et al. | 713/330 |
| 7,517,162 B2 * | 4/2009 | Aizawa | 400/62 |
| 7,587,536 B2 * | 9/2009 | McLeod | 710/65 |
| 7,698,484 B2 * | 4/2010 | Ikeda et al. | 710/104 |
| 8,078,888 B2 * | 12/2011 | Kumakura | 713/300 |
| 8,464,082 B2 * | 6/2013 | Shibao | 713/310 |
| 2003/0204661 A1 * | 10/2003 | Uemura | 710/305 |
| 2005/0091437 A1 * | 4/2005 | Yang et al. | 710/313 |
| 2007/0067551 A1 | 3/2007 | Ikeda et al. | |
| 2011/0225640 A1 * | 9/2011 | Ganapathy et al. | 726/8 |

FOREIGN PATENT DOCUMENTS

| | | |
|---|---|---|
| JP | 7-195802 A | 8/1995 |
| JP | 2002-142038 | 5/2002 |
| JP | 2003-209659 A | 7/2003 |
| JP | 2005-352812 | 12/2005 |
| JP | 2007-36318 A | 2/2007 |
| JP | 2007-87082 | 4/2007 |
| JP | 2007-324650 | 12/2007 |

* cited by examiner

*Primary Examiner* — Twyler Haskins
*Assistant Examiner* — Dennis Dicker
(74) *Attorney, Agent, or Firm* — Birch, Stewart, Kolasch & Birch, LLP

(57) ABSTRACT

In one embodiment, a network system according to the present invention is a network system in which a plurality of image forming apparatuses are communicably connected via a network, and an electronic device capable of independent operation is communicably connected to each of the plurality of image forming apparatuses. The electronic device includes a data input/output unit that sends/receives control data of the electronic device to/from the image forming apparatus to which the electronic device is connected, and the image forming apparatus includes a data communications unit that sends/receives the control data to/from the electronic device connected to the image forming apparatus, and a network communications unit that sends/receives the control data to/from another image forming apparatus via the network. Furthermore, the data communications unit and the network communications unit of each image forming apparatus send the control data of the electronic device to each of the other electronic devices via the network, the data input/output unit of each of the other electronic devices receives the control data, and each of the other electronic devices operates based on the received control data.

8 Claims, 3 Drawing Sheets

NETWORK SYSTEM, ELECTRONIC DEVICE, AND METHOD FOR CONTROLLING ELECTRONIC DEVICE IN NETWORK SYSTEM

CROSS-REFERENCE TO RELATED APPLICATIONS

This application claims priority under 35 U.S.C. §119(a) on Patent Application No. 2009-278345 filed in Japan on Dec. 8, 2009, the entire contents of which are herein incorporated by reference.

BACKGROUND OF THE INVENTION

Field of the Invention

The present invention relates to a network system in which a plurality of image forming apparatuses are connected via a network and an independently operable electric device is communicably connected to each of the plurality of image forming apparatuses, an electronic device that can be connected to an image forming apparatus, and a method for controlling an electronic device in a network system.

In a network system in which a plurality of image forming apparatuses are connected via a network and an independently operable electric device is communicably connected to each of the plurality of image forming apparatuses, image data or the like can be sent/received between the image forming apparatuses. An image forming apparatus, for example, reads an image formed on an original, and sends image data that expresses the original image that was read. Also, an image forming apparatus prints an image that corresponds to image data received via the network on recording paper.

In JP H7-195802A, a plurality of personal computers and a plurality of printing devices are connected via a network, image data is sent from a personal computer to a printing device, and the printing device prints an image that corresponds to the received image data. Furthermore, when a power switch of even one of the plurality of personal computers is switched on, a power switch of the printing device is also switched on, so that printing can be performed by the printing device.

Incidentally, among image forming apparatuses, there are image forming apparatuses to which it is possible to selectively combine and connect various optional devices, and with these optional devices, it is possible to perform a plurality of types of processing such as copying, original reading, printing, and image data communications. Thus, convenience in an office can be increased.

Moreover, recently optional devices of image forming apparatuses have become more diverse, and in some cases even if the image forming apparatus is stopped, an optional device can be used if a power switch of the optional device is on. For example, when a facsimile communications device has been combined as an optional device, even if a power switch of the image forming apparatus is in an off state, a facsimile can be received if a power switch of the facsimile communications device is in an on state.

Therefore, when an independently operable electronic device has been connected to each of the plurality of image forming apparatuses on the network as described above, regardless of the operational state of each image forming apparatus, it is conceivable to cause the electronic devices connected to the image forming apparatuses to operate in coordination via the network. However, such coordinated operation has not yet been realized.

In JP H7-195802A, the power of the printing device is switched on in coordination with power of the personal computer being on, but coordinated operation between electronic devices that have been connected to the printing device is not realized.

SUMMARY OF THE INVENTION

The present invention was made in order to address the above problems, and it is an object thereof to provide a network system in which it is possible to cause electronic devices that have been connected to respective image forming apparatuses to operate in coordination via a network regardless of the operational state of the image forming apparatuses on the network, an electronic device that has been connected to an image forming apparatus, and a method for controlling an electronic device in a network system.

In order to address the above problems, the present invention provides a network system in which a plurality of image forming apparatuses are communicably connected via a network, and an electronic device capable of independent operation is communicably connected to each of the plurality of image forming apparatuses; the electronic device comprising a data input/output unit that sends/receives control data of the electronic device to/from the image forming apparatus to which the electronic device is connected; and the image forming apparatus comprising a data communications unit that sends/receives the control data to/from the electronic device connected to the image forming apparatus, and a network communications unit that sends/receives the control data to/from another image forming apparatus via the network, in which the data communications unit and the network communications unit of each image forming apparatus send the control data of the electronic device to each of the other electronic devices via the network, the data input/output unit of each of the other electronic devices receives the control data, and each of the other electronic devices operates based on the received control data.

In such a system, it is possible to send electronic device control data to other electronic devices via each image forming apparatus and the network, so each electronic device can be controlled based on the control data. Accordingly, it is possible to cause the electronic devices to operate in coordination.

The control data is data that instructs starting of the electronic device.

In this case, data that instructs starting is sent to each electronic device, and these electronic devices are started in coordination. That is, each electronic device is started in coordination.

Furthermore, each of the electronic devices generates the control data in response to an input operation that instructs starting.

Accordingly, when an input operation causing starting of a single electronic device is performed, control data that instructs starting is generated, this control data is sent to each electronic device, and these electronic devices are started.

Also, the electronic device includes a control unit that controls the electronic device based on the control data.

In this case, it is possible to control the electronic device based on the control data.

Also, the data communications unit and the network communications unit of the image forming apparatus are configured to be operable even when the image forming apparatus is in a power-saving state.

Also, the electronic device is configured to be capable of starting even when the power switch of the image forming apparatus to which the electronic device is connected is in an off state.

Therefore, even if an image forming apparatus is in a power-saving state, an electronic device of this image forming apparatus is capable of performing data communications with an electronic device of another image forming apparatus. Accordingly, it is possible to send/receive control data between each of the electronic devices, and cause each of the electronic devices to operate in coordination. For example, it is possible to cause each of the electronic devices to start in coordination.

On the other hand, the present invention provides an electronic device configured to be connected to each of a plurality of image forming apparatuses on a network, the electronic device including a data input/output unit that sends/receives control data of the electronic device to/from each of the other electronic devices via each of the image forming apparatuses and the network, in which the electronic device is controlled based on the control data.

This sort of electronic device exhibits the same operation and effects as in the above network system according to the present invention.

Also, the present invention provides a method for controlling electronic devices in a network system in which a plurality of image forming apparatuses are communicably connected via a network, and an electronic device capable of independent operation is communicably connected to each of the plurality of image forming apparatuses, in which regardless of the operating state of each image forming apparatus, control data is sent/received between each of the electronic devices via the image forming apparatuses and the network, and each of the electronic devices is controlled based on the control data.

This sort of control method exhibits the same operation and effects as in the above network system according to the present invention.

DESCRIPTION OF THE PREFERRED EMBODIMENTS

Hereinafter, an embodiment(s) of the present invention will be described in detail with reference to the attached drawings.

Figure 1:
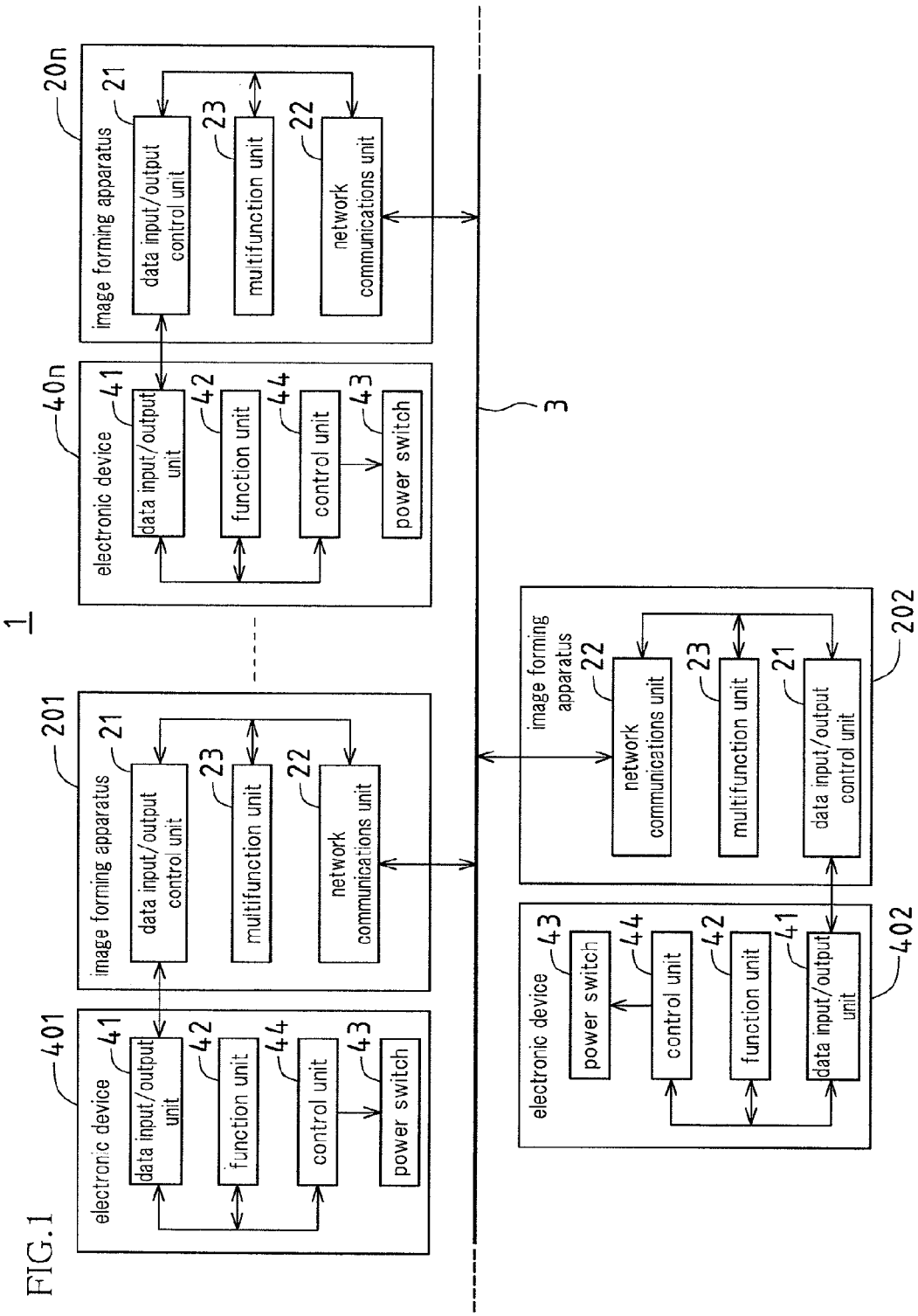
FIG. 1 is a block diagram that shows an embodiment of a network system of the present invention.

FIG. 1 is a block diagram that shows one embodiment of a network system of the present invention. In a network system 1 of this embodiment, a plurality of image forming apparatuses 201, 202, . . . , 20*n* are connected via a network 3, and data communications are possible between the image forming apparatuses 201 to 20*n*.

The network 3, for example, is a LAN, the internet, a telephone network, or a combination thereof, and is configured such that a server or the like can be connected to the network 3.

The image forming apparatuses 201 to 20*n* are each multifunction devices capable of selectively executing a plurality of types of processing, such as copying, original image reading, printing, image data sending/receiving, and so forth. The image forming apparatuses 201 to 20*n* are each provided with a data input/output control unit (data communications unit) 21, a network communications unit 22, and a multifunction unit 23.

Electronic devices 401 to 40*n* are respectively connected to the image forming apparatuses 201 to 20*n*. Each of the electronic devices 401 to 40*n* is, for example, an air cleaner. The electronic devices 401 to 40*n* are each provided with a data input/output unit 41, a function unit 42, a power switch 43, and a control unit 44. The air cleaner cleans air within a room, and removes ozone or the like that has been discharged from the image forming apparatuses 201 to 20*n*.

Figure 2:
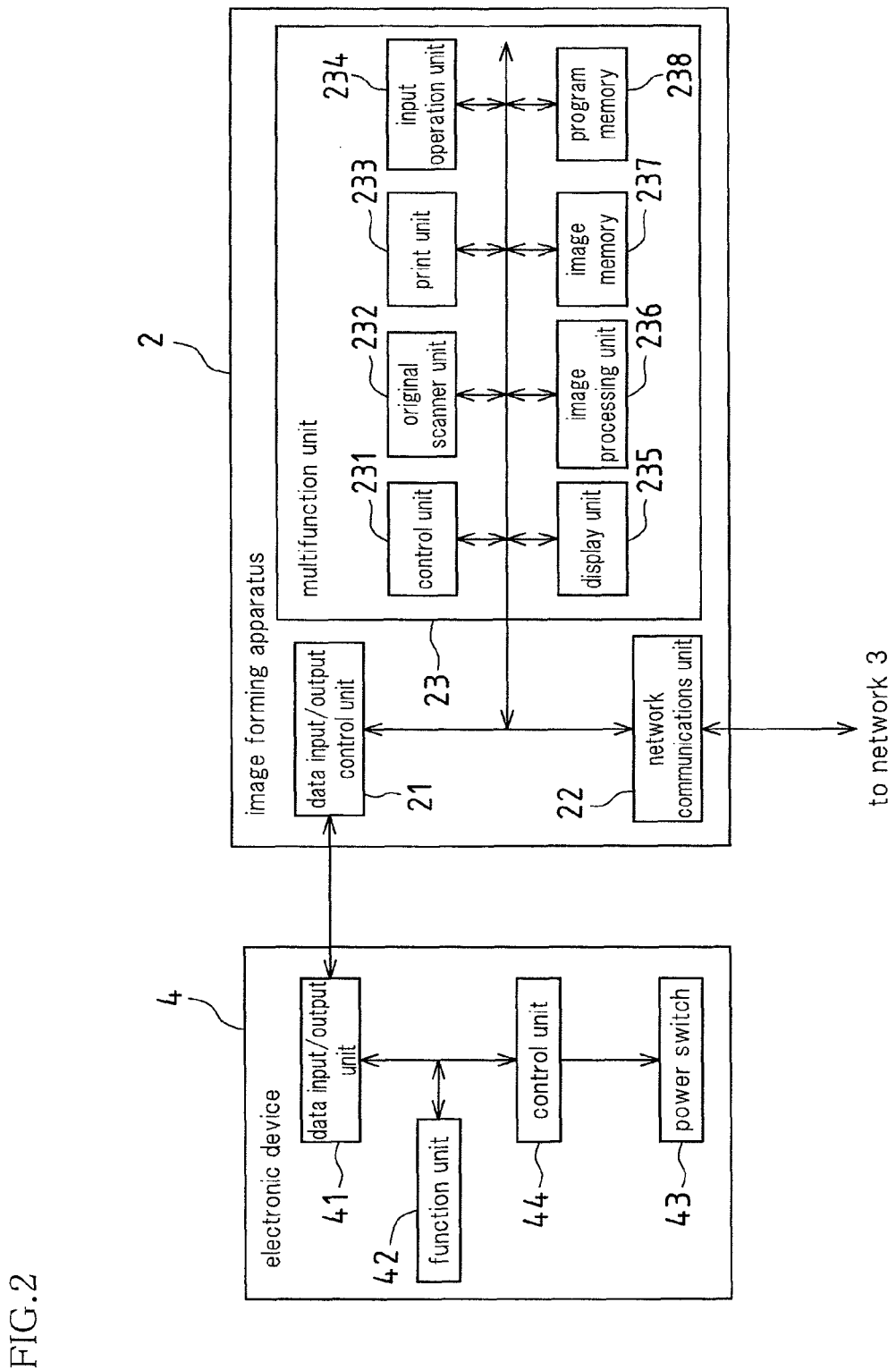
FIG. 2 is a block diagram that shows the configuration of one combination of an image forming apparatus and an electronic device in the system in FIG. 1.

FIG. 2 is a block diagram that shows the configuration of one combination of an image forming apparatus and an electronic device in the system in FIG. 1. In FIG. 2, reference symbol 2 is used in place of reference symbols 201 to 20*n* of the respective image forming apparatuses, and reference symbol 4 is used in place of reference symbols 401 to 40*n* of the respective electronic devices.

In the image forming apparatus 2, the data input/output control unit 21 sends/receives control data to/from the data input/output unit 41 of the electronic device 4, and also performs part of control of the electronic device 4.

The network communications unit 22, via the network 3, sends/receives control data to/from other image forming apparatuses 2, and performs facsimile communications of image data. Also, the network communications unit 22, via the network 3, can send/receive control data and image data to/from an external terminal such as a personal computer.

The multifunction unit 23 is provided with a control unit 231, an original scanner unit 232, a print unit 233, an input operation unit 234, a display unit 235, an image processing unit 236, an image memory 237, a program memory 238, and so forth. The control unit 231 reads out and executes various programs from the program memory 238 to control the image forming apparatus 2 as a whole. The original scanner unit 232 reads an image that has been formed on an original, and outputs image data that corresponds to the original image. The image memory 237 temporarily stores image data that has been output from the original scanner unit 232, and image data sent/received by the network communications unit 22. The image processing unit 236 performs various image processing on image data that has been temporarily stored in the image memory 237. The print unit 233 prints an image or the like on recording paper using, for example, an electrophotographic method. The print unit 233 forms an image that corresponds to image data in the image memory 237 as an electrostatic latent image on the surface of a photosensitive body, develops the electrostatic latent image on the surface of the photosensitive body using toner, forms a toner image on the surface of the photosensitive body, transfers the toner image from the photosensitive body to the recording paper, and applies heat and pressure to the recording paper to fix the toner image on the recording paper. The display unit 235 is a liquid crystal display device, for example. The input operation unit 234 accepts operation from a user. The input operation unit 234 is configured with keys, buttons, or a touch panel disposed overlaid on a screen of the display unit 235, for example.

In this sort of image forming apparatus 2, a power switch (not shown) is provided, and when this power switch is operated to switch on the power switch, the multifunction unit 23 as a whole is started. When the power switch is switched off, supply of power to the original scanner unit 232, the print unit 233, the input operation unit 234, the display unit 235, and so forth in the multifunction unit 23 is stopped, and thus power consumption is reduced.

However, regardless of the on/off state of the power switch, supply of power to the control unit 231 of the multifunction unit 23, the data input/output control unit 21, the network communications unit 22, and so forth is continued, so that these units are kept in an operable state. Therefore, regardless of the on/off state of the power switch, it is possible to send/receive control data to/from the data input/output unit 41 of the electronic device 4 via the data input/output control unit 21, and possible to send/receive control data and image data to/from other image forming apparatuses 2 via the network communications unit 22 and the network 3.

The reason for adopting such a configuration is so that image data can always be received from the other image forming apparatuses 2 and external terminals. Also, with such a configuration, as described below, regardless of the power supply state of the image forming apparatus 2 (including an off state of the power switch and a power-saving state), it is possible to send/receive control data between the respective electronic devices 4 that have been connected to the respective image forming apparatuses 2.

Also, when the on/off state of the power switch of the image forming apparatus 2 is switched according to a time schedule that has been set in advance, the image forming apparatus 2 operates in the following manner. When the power switch is on, the multifunction unit 23 as a whole is started. Regardless of the on/off state of the power switch, the control unit 231 of the multifunction unit 23, the data input/output control unit 21, the network communications unit 22, and so forth are kept in an operable state. Therefore, the multifunction unit 23 is enabled to send/receive image data and control data.

Furthermore, even when a standby state of the image forming apparatus 2 continues for a long time and so the image forming apparatus 2 changes to a power-saving state, the control unit 231, the data input/output control unit 21, the network communications unit 22, and so forth are kept in an operable state. Therefore, in this case as well, the multifunction unit 23 is enabled to send/receive image data and control data.

Accordingly, regardless of the power supply state of the image forming apparatus 2 (including an off state of the power switch and a power-saving state), the image forming apparatus 2 can send/receive image data, and the electronic device 4 can send/receive control data.

In the electronic device 4, the data input/output unit 41 sends/receives control data to/from the data input/output control unit 21 of the image forming apparatus 2.

The function unit 42 handles the main function of the electronic device 4. For example, when the electronic device 4 is an air cleaner, the function unit 42 corresponds to an air blowing fan and an ion generation device of the air cleaner.

The power switch 43 is operated in order to switch the function unit 42 of the electronic device 4 on or off. When the power switch 43 is switched on or off, the function unit 42 of the electronic device 4 is started, or operation of the function unit 42 is stopped.

The control unit 44 controls the function unit 42 of the electronic device 4. For example, when the electronic device 4 is an air cleaner, and function unit 42 is an air blowing fan and an ion generation device, the control unit 44 controls an amount of air blowing by the air blowing fan and an amount of ion generation by the ion generation device. Also, independent of operation by the user, the control unit 44 is able to start the function unit 42 or stop operation of the function unit 42 by switching the power switch 43 on or off.

Furthermore, the data input/output unit 41 and the control unit 44 receive power supply and are kept in an operable state regardless of the on/off state of the power switch 43. Therefore, control data can always be sent/received via the data input/output unit 41 to/from the data input/output control unit 21 of the image forming apparatus 2, and the power switch 43 of the electronic device 4 can always be switched on/off by the control unit 44.

Starting or operation stoppage of the function unit 42 of the electronic device 4 can be performed not only by switching of the power switch 43, but also by switching in coordination with the on/off state of the power switch of the image forming apparatus 2. Moreover, a configuration may also be adopted in which these switching methods can be selected and set in each electronic device 4.

In the network system 1 in FIG. 1, image data can be sent/received between the image forming apparatuses 2 via the network 3. The image forming apparatus 2 reads an image that has been formed on an original with the original scanner unit 232, and sends image data that corresponds to the original image that was read from the network communications unit 22 via the network 3. Also, the image forming apparatus 2 receives image data with the network communications unit 22, and prints an image that corresponds to the image data that was received on recording paper with the print unit 233.

Even when the power switch of the image forming apparatus 2 is in an off state, or the image forming apparatus 2 is in a power-saving state, if the power switch 43 of the electronic device 4 is switched on, the electronic device 4 can be started. For example, in a case where the electronic device 4 is an air cleaner, even if the power switch of the image forming apparatus 2 is off, when the power switch 43 is switched on, it is possible to start the air cleaner 4 and cleaner air within the room.

Therefore, regardless of the power supply state of the plurality of image forming apparatuses 2 on the network 3, if the air cleaners of the respective image forming apparatuses 2 are operated in coordination, convenience is improved. For example, in a circumstance where a plurality of image forming apparatuses 2 have been installed in a large office, if the air cleaners 4 connected to the respective image forming apparatuses 2 are started or stopped together, it is possible to efficiently clean air in the large office.

Consequently, in the network system 1 of the present embodiment, when at least any one of the plurality of electronic devices 4 is started, control data that instructs starting of the electronic device 4 is generated. The generated control data is sent to the other electronic devices 4 via the network 3. Furthermore, the electronic devices 4 are started based on the received control data.

Figure 3A:
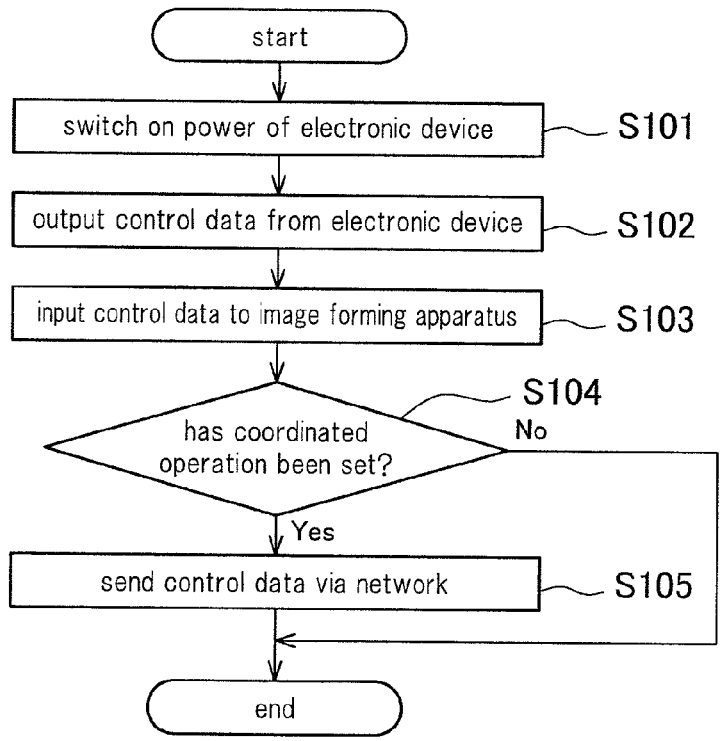
FIG. 3A is a flowchart that shows a processing procedure of an image forming apparatus and an electronic device on a control data sending side.
Figure 3B:
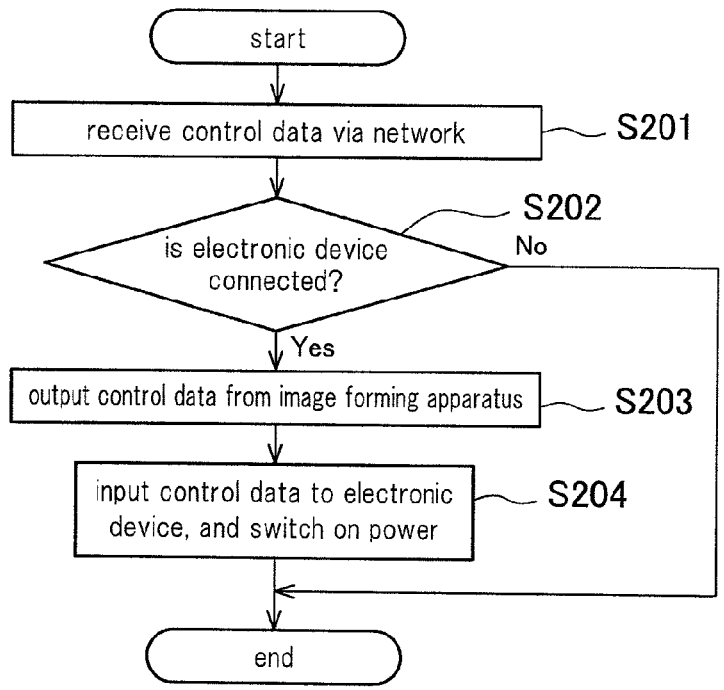
FIG. 3B is a flowchart that shows a processing procedure of an image forming apparatus and an electronic device on a control data receiving side.

Next is a description of a processing procedure for causing such coordinated operation of the electronic devices 4, with reference to flowcharts in FIGS. 3A and 3B. FIG. 3A shows a processing procedure of an image forming apparatus 2 and an electronic device 4 on the control data sending side, and FIG. 3B shows a processing procedure of an image forming apparatus 2 and an electronic device 4 on the control data receiving side.

First, as shown in FIG. 3A, in the image forming apparatus 2 on the control data sending side, it is assumed that the function unit 42 of the electronic device 4 has stopped operation. In this state, when the power switch 43 of the electronic device 4 is switched on (Step S101), the function unit 42 of the electronic device 4 is started. For example, when the electronic device 4 is an air cleaner, the air blowing fan and the ion generation device of the air cleaner are started.

The control unit 44 of the electronic device 4 generates control data that instructs starting of the electronic device 4 in response to the power switch 43 being switched on. The generated control data is sent from the data input/output unit 41 to the data input/output control unit 21 of the image forming apparatus 2 (Step S102).

When the data input/output control unit 21 of the image forming apparatus 2 receives the control data that instructs starting of the electronic device 4 (Step S103), the data input/output control unit 21 determines whether or not coordinated operation of the respective electronic devices 4 has been set (Step S104).

Here, in the network system 1, it is assumed that whether or not coordinated operation of the respective electronic devices 4 has been set is registered in advance. This registration, for example, is performed by an input operation via the input operation unit 234 of an arbitrary image forming apparatus 2. Also, this registration content, that is, whether or not coordinated operation of the respective electronic devices 4 is set, is stored in a built-in memory of the data input/output control unit 21. Moreover, this registration content is sent from the network communications unit 22 to the other image forming apparatuses 2 via the network 3, and also stored in the built-in memory of the data input/output control unit 21 of the other image forming apparatuses 2.

Therefore, in any image forming apparatus 2, the data input/output control unit 21 can refer to the built-in memory of that image forming apparatus 2 and determine whether or not coordinated operation of the respective electronic devices 4 has been set.

For example, when the data input/output control unit 21 of the other image forming apparatus 2 determines that coordinated operation of the respective electronic devices 4 has been set ("Yes" in Step S104), the data input/output control unit 21 sends control data instructing starting of the electronic device 4 from the network communications unit 22 to the other image forming apparatuses 2 via the network 3 (Step S105).

Next, as shown in FIG. 3B, in another image forming apparatus 2, control data that instructs starting of the electronic device 4 of that image forming apparatus 2 is received by the network communications unit 22, and the received control data is output to the data input/output control unit 21 (Step S201). When the control data is input, the data input/output control unit 21 determines whether or not an electronic device 4 is connected to that other image forming apparatus 2 (Step S202). This determination can be performed by making an inquiry from the data input/output control unit 21 to the control unit 44 via the data input/output unit 41 of the electronic device 4.

For example, when the data input/output control unit 21 determines that an electronic device 4 is connected ("Yes" in Step S202), control data that instructs starting of the electronic device 4 is output to the data input/output unit 41 of the electronic device 4 (Step S203).

In the electronic device 4, control data that instructs starting of that electronic device 4 is output to the control unit 44 via the data input/output unit 41. In response to the control data that has been input, the control unit 44 switches on the power switch 43 and starts the function unit 42 (Step S204).

On the other hand, when determined that coordinated operation of the respective electronic devices 4 has not been set ("No" in Step S104), Step S105 is not executed, so control data is not sent. Also, when determined that an electronic device 4 has not been connected ("No" in Step S202), Step S204 is not executed, so the function unit 42 is not started.

Thus, when the power switch 43 of the electronic device 4 of a single image forming apparatus 2 is switched on and the function unit 42 is started, control data that instructs starting of the electronic device 4 is generated. Then, this control data is transmitted from the data input/output unit 41 of the electronic device 4 to the data input/output control unit 21 and the network communications unit 22 of the image forming apparatus 2, then to the network 3, then to the data input/output control unit 21 and the network communications unit 22 of another image forming apparatus 2, then to the data input/output unit 41 and the control unit 44 of the electronic device 4 that has been connected to the other image forming apparatus 2. As a result, the function unit 42 is started by the control unit 44 of the electronic device 4 that has been connected to the other image forming apparatus 2. Of course, when a plurality of other image forming apparatuses 2 are connected to the network 3, and an electronic device 4 has been connected to each of these other image forming apparatuses 2, control data is sent to each of these other image forming apparatuses 2. As a result, the function unit 42 of each electronic device 4 that has been connected to the other image forming apparatuses 2 is started according to the instruction by the control data. Accordingly, it is possible to cause all of the electronic devices 4 to operate in coordination based on the control data.

Also, as described above, in the image forming apparatus 2, even when the power switch of the image forming apparatus 2 is in an off state, or the image forming apparatus 2 is in a power-saving state, it is possible to send/receive control data to/from the data input/output unit 41 of the electronic device 4 via the data input/output control unit 21, and possible to send/receive control data and image data to/from another image forming apparatus 2 via the network communications unit 22 and the network 3. Also, in the electronic device 4, regardless of the on/off state of the power switch 43, it is possible to send/receive control data to/from the data input/output control unit 21 of the image forming apparatus 2 via the data input/output unit 41, and possible to switch the function unit 42 of the electronic device 4 on/off with the control unit 44. Therefore, regardless of the power supply state of the image forming apparatuses 2 on the network 3, when the power switch 43 of a single electronic device 4 is switched on and the function unit 42 of the electronic device 4 is started, control data is generated, this control data is transmitted to each of the other electronic devices 4, and the function unit 42 of each of the other electronic devices 4 is also started.

Above, an embodiment of the present invention is described in detail, but the present invention is not limited to the above embodiment; an embodiment including design modifications or the like that do not depart from the gist of the present invention also falls within the scope of the present invention.

For example, the control data is not limited to instructing starting of the electronic device, and may also be data that instructs various other operations of the electronic device. For example, if the electronic device is an air cleaner, the control data may also be data that instructs the amount of air blowing or the amount of ion generation.

Also, an air cleaner is given as an example of an electronic device, but another type of electronic device may also be used as long as the electronic device can operate independently from the image forming apparatus.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. A network system in which a plurality of image forming apparatuses are communicably connected via a network, and an electronic device capable of independent operation is communicably connected to each of the plurality of image forming apparatuses;
the electronic device comprising a data input/output unit that sends/receives control data of the electronic device to/from the image forming apparatus to which the electronic device is connected; and
the image forming apparatus comprising a data communications unit that sends/receives the control data to/from the electronic device connected to the image forming apparatus, and a network communications unit that sends/receives the control data to/from another image forming apparatus via the network,
wherein the data communications unit and the network communications unit of each image forming apparatus send the control data of the electronic device to each of the other electronic devices via the network,
the data input/output unit of each of the other electronic devices receives the control data, and
each of the other electronic devices operates based on the received control data
wherein the data communications unit and the network communications unit of the image forming apparatus are configured to be operable even when the image forming apparatus is in a power-saving state.

2. The network system according to claim 1,
wherein the control data is data that instructs starting of the electronic device.

3. The network system according to claim 2,
wherein each of the electronic devices generates the control data in response to an input operation that instructs starting.

4. The network system according to claim 1,
wherein the electronic device includes a control unit that controls the electronic device based on the control data.

5. A network system in which a plurality of image forming apparatuses are communicably connected via a network, and an electronic device capable of independent operation is communicably connected to each of the plurality of image forming apparatuses;
the electronic device comprising a data input/output unit that sends/receives control data of the electronic device to/from the image forming apparatus to which the electronic device is connected; and
the image forming apparatus comprising a data communications unit that sends/receives the control data to/from the electronic device connected to the image forming apparatus, and a network communications unit that sends/receives the control data to/from another image forming apparatus via the network,
wherein the data communications unit and the network communications unit of each image forming apparatus send the control data of the electronic device to each of the other electronic devices via the network,
the data input/output unit of each of the other electronic devices receives the control data, and
each of the other electronic devices operates based on the received control data,
wherein the electronic device is configured to be capable of starting even when the power switch of the image forming apparatus to which the electronic device is connected is in an off state.

6. The network system according to claim 5,
wherein the control data is data that instructs starting of the electronic device.

7. The network system according to claim 6,
wherein each of the electronic devices generates the control data in response to an input operation that instructs starting.

8. The network system according to claim 5,
wherein the electronic device includes a control unit that controls the electronic device based on the control data.

* * * * *